Nov. 10, 1959   L. J. RAVER   2,912,594
BATTERY CHARGING CIRCUIT
Filed Sept. 13, 1956
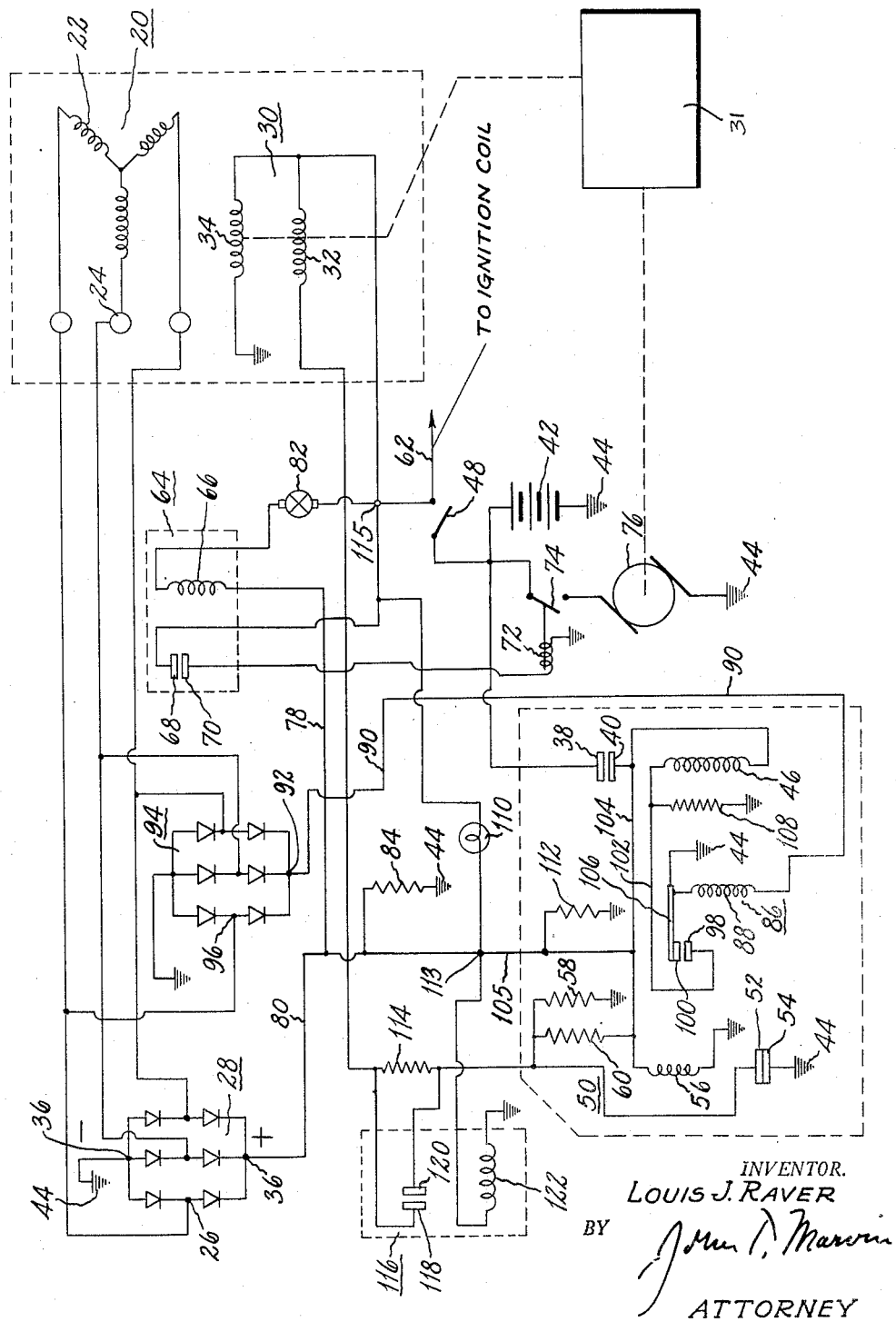
INVENTOR.
LOUIS J. RAVER
BY
ATTORNEY

United States Patent Office 2,912,594
Patented Nov. 10, 1959

2,912,594

BATTERY CHARGING CIRCUIT

Louis J. Raver, Anderson, Ind., assignor to General Motors Corporation, Detroit, Mich., a corporation of Delaware Application September 13, 1956, Serial No. 609,566

10 Claims. (Cl. 290—36)

This invention relates to generating and starting systems for motor vehicles and more particularly to systems wherein a storage battery is charged by an A.C. generator which is driven by the variable speed prime mover and the starting system includes a relay which is responsive to the output of the generator to prevent engagement of the starter with the prime mover during periods when the prime mover is self-operative.

The present day motor vehicles are frequently provided with alternators or A.C. generators which are driven at variable speeds by the prime mover of the vehicle. These alternators are arranged to supply alternating current to various pieces of electrical equipment which is rectified to direct current for battery charging and other purposes. These vehicles may be also provided with automatic starting systems for initially energizing the prime mover. When an automatic starting system is used, as for example when the starting switch is actuated by a full depression of the accelerator, it is imperative that the starting circuits be actuated only when the prime mover is inoperative. This is usually accomplished by employing a relay in the starting motor circuit which relay has its actuating coil connected to be energized by the vehicle battery and is prevented from being energized whenever the alternator has an output. When this arrangement is employed, the energization of the relay will be prevented whenever the prime mover is self-operative and the generator is producing current and voltage to charge the battery. These systems have long been used in connection with direct current generators. At this point it is to be noted that one of the advantages of installing an alternator in a motor vehicle is that the alternator has substantially higher output during idling speeds than a direct current generator. This is very advatageous when the motor vehicle is exposed to prolonged idling. However, this characteristic of the alternator frequently will cause the starting relay to become de-energized when false starts occur. Another feature which is frequently desired in automotive battery charging systems in the presence of an indicator light to advise the operator of the motor vehicle that his battery charging system is properly functioning. The present invention is also directed to a system whereby such an indicator light may be included in a battery charging system that includes an alternator and a rectifier.

It is therefore an object of the present invention to provide a starting and electrical generating system for a motor vehicle wherein a relay which controls the energization of the starting system and is responsive to the output of the generating system will not be affected by the output of the generating system during starting periods.

A further object of the present invention is to provide a motor vehicle with a generating system which includes an alternator that has an exciting field winding and a starting system which includes a relay that is energized from the storage battery and is affected by the output of the alternator with a means which will reduce the energization of the alternating field during periods when the prime mover is initially rotated by the starting motor.

Another object of the present invention is to provide a motor vehicle with an A.C. generating system and a starting system and to interconnect the two systems to prevent the energization of the starting system while the prime mover is self-operative and to provide a means in the generating system which will permit the starting system to be energized during periods when the prime mover is no longer self-operative.

A still further object of the present invention is to reduce the energization of the field of an alternator in a motor vehicle battery charging circuit when the prime mover of the vehicle is initially rotated, during starting periods and to control the circuit between the alternator and storage battery so that a relay which controls the starting motor circuit is not energizable during periods when the alternator is charging the battery.

Further objects and advantages of the present invention will be apparent from the following description, reference being had to the accompanying drawings wherein a preferred embodiment of the present invention is clearly shown.

In the drawings:

The single figure shows diagrammatically a generating and starting circuit for a motor vehicle according to the present invention.

In the drawing, an alternating current generator or alternator 20 is shown. This alternator 20 may be either of the Y or delta connected type, and is here shown as having a Y connected stator winding 22 which through load terminals 24 supplies alternating current to the input terminals 26 of the power rectifier 28. The alternator 20 is provided with a conventional type exciting field winding 30 which may have a main coil 32 and a reverse coil 34 to provide the alternator 20 with proper charging and voltage output characteristics when the winding 30 is rotatably driven at variable speeds by the vehicle prime mover 31.

The rectifier 28 has a pair of output terminals 36, one of the output terminals 36 is being grounded at 44. The other output terminal 36 is connected through a suitable direct current load circuit which includes a pair of normally open contacts 38 and 40 with a storage battery 42. The storage battery 42 has one of its terminals grounded at 44. The contacts 38 and 40 are part of the cut-out relay that has its actuating coil winding 46 connected in a circuit which will be hereinafter described.

The main generator field 32 is connected to the battery through an ignition switch 48 of the prime mover. This switch when closed will complete a circuit from the battery 42 through the field winding 32 and the voltage regulator 50. The voltage regulator has a pair of normally closed contacts 52 and 54 which are adapted to be opened when the energization of the coil-winding 56 of the regulator 50 exceeds a predetermined value in response to the voltage potential across the direct current load circuit. The voltage regulator 50 may be of any suitable type and may include the vibratory type relays which are well-known and connected in the field 32 circuit to be responsive to the potential of the direct current load circuit of the rectifier in the manner well-known to those well-skilled in the art.

The regulator 50 here shown has a regulating resistance 58 and an arc reducing resistance 60 which will minimize the arcing across the contacts 52 and 54 when they open. Included also in the drawing is the direct current load circuit 62 which may comprise the ignition system and other direct current accessories of the vehicle which are generally controlled by the ignition switch 48.

The starting system shown includes a relay 64 which has an actuating coil 66 and a pair of normally opened contacts 68 and 70. These contacts when closed will permit the actuating coil 72 of the starting motor solenoid to be energized from the battery 42. When the actuating coil 72 is energized, the normally open switch contacts 74 are closed so the starting motor 76 may be energized through a circuit from the battery 42.

As clearly seen in the drawing the actuating coil 66 has one of its ends connected through a lead 78 with a lead 80 that is connected to the output terminal 36 of the main rectifier 28. The other output lead of the coil 66 is connected through a suitable starter switch 82, the ignition switch 48 to the storage battery 42. From the above it is apparent that whenever switches 48 and 82 are closed, current will flow from the battery 42 through the coil winding 66, lead 78, through a resistance 84, 112 and other parallel paths to ground 44. When, however, the alternator 20 is producing a sufficient current and voltage output and the contacts 38 and 40 are closed, the voltage impressed on the coil winding 66 from lead 78 will be substantially equal to the voltage impressed on coil winding 66 through switch 82. This will prevent the coil winding 66 from being energized sufficiently to close contacts 68 and 70. Further, an examination of the circuit will reveal that when contacts 38 and 40 are closed a circuit will be closed which will permit battery voltage to be impressed on both ends of the coil winding 66 and will prevent the coil winding 66 from causing the closure of contacts 68 and 70, even though the alternator 20 is not producing a current and voltage. It is one of the features of the present invention to eliminate this possibility. This is accomplished by providing an auxiliary relay 86 which will control the energization of the coil winding 46 in the main or cut-out relay in a manner which will become here and after apparent. The auxiliary relay 86 is connected as shown, that is the coil winding 88 thereof is connected through a lead 90 with one of the output terminals 92 of an auxiliary rectifier 94 which has its input terminals 96 directly connected to the output terminals 24 of the alternator. The other end of the coil winding 88 is grounded at 44. The coil winding 88 when energized is adapted to close a pair of normally open contacts 98 and 100. The contact 98 is connected through a lead 102 with the actuating coil 46 of the cut-out relay. The other end of the coil winding 46 is connected through a lead 104 and lead 80 to the output terminal 36 of the main rectifier. When the above circuit is used as soon as the alternator 20 is producing a current and voltage, the auxiliary rectifier 94 will cause a current and voltage to flow through lead 90 to the coil winding 88 to energize the same and cause contacts 98 and 100 to close. When contacts 98 and 100 are closed, the circuit is complete from lead 104 through coil winding 46, lead 102, the closed contacts 98 and 100 and the armature 106 which is grounded at 44. Thus the coil winding 46 will be energized from the main rectifier 28 to cause contacts 38 and 40 to be closed to complete the circuit between the main rectifier 28 and the battery 42.

On the other hand, should the alternator 20 cease to produce a current and voltage, so that current and voltage no longer flows through lead 90, and then the coil 88 will be deenergized and contacts 98 and 100 will open and break the energizing circuit through coil winding 46. This will cause the contacts 38 and 40 to separate which in turn will prevent the possible flow of current from the battery to lead 78. This will permit the coil winding 66 to be energized and close contacts 68 and 70 so the starter circuit may be energized. Included also in the circuit is a resistance 108. This resistance 108 will reduce arcing of contacts 98 and 100 and aid in deenergizing coil 46 when the contacts 98 and 100 open.

Another feature of the present system is that the use of the auxiliary relay 86 permits the use of an indicating means in the system, which includes the indicating lamp 110 and a resistance 112. The resistance 112 is connected to the output terminal 36 of the rectifier and is here shown as connected to lead 80. The indicating lamp 110, which may be suitably mounted on the dashboard of the vehicle, is connected to the output terminal 36 of the rectifier 28 at junction 113 and through junction 115, to the ignition switch 48 to the battery 42. When the various elements in the circuit are so connected and the switch 48 is closed, a large portion of the battery voltage will be applied across the indicator lamp 110, which in turn will be grounded through the resistance 112, and 84 and other parallel paths. When the circuit to the lamp is thus completed, a portion of the battery voltage will be impressed across the indicator lamp 110 and the remaining portions thereof will be dissipated over the resistance 112, 84 and other parallel paths. The indicator light is preferably designed to operate at a portion of the battery voltage i.e. 6 volts in the 12 volt battery system and will burn when the alternator is not producing an A.C. voltage. When the ignition switch 48 is closed, and the engine is started, the alternator will produce an A.C. voltage at terminal 24. If the rectifier 28 is properly operating, this voltage will be rectified to a D.C. voltage and the current by the rectifier 28 and will be impressed from lead 80 on the left terminal of lamp 110. The alternator voltage thus impressed across the bulb 110 opposes the battery voltage and when the alternator voltage output is sufficient, it will cause a volage drop across the bulb to be reduced so that the glow of the filament will no longer be visible and thus advise the motor vehicle operator that the alternating current system is in working order. It is also to be appreciated that the voltage regulator 50 is preferably adjusted so that the voltage at the terminal 36 of the rectifier will be somewhat higher than that of the battery 42 so that current will flow to the battery. This difference in potential between the alternator and battery will not be sufficient to cause the lamp 110 to become incandescent. When, however, a failure of the alternator or the main rectifier 28 occurs, the battery voltage will be impressed across the resistance 112, 84, and other parallel paths, and the light 110 will become incandescent to warn the operator of the vehicle that the alternator or main rectifier 28 has failed.

Another feature of the present invention is the utilization of the resistance 114 and the relay 116. This resistance 114 and relay 116 is utilized to reduce the energization of field 32 during the periods of initial rotation of the prime mover by the starter 76. When an alternating current generator is used with the type of system herein contemplated, because of the characteristics of the alternator, the alternator will produce a high output current and voltage at very low speeds, and frequently during starting periods, the output of the alternator through rectifier 28 will be sufficient to cause a coil winding 66 to become de-energized. This will occur during the periods when a flooded engine is being cranked or when false starts occur. The relay 116 has a pair of normally opened contacts 118 and 120 and an actuating coil 122. The resistance of the coil 122 is preferably selected so that it will be energized and close contacts 118 and 120 at some voltage which is appreciably less than the regulated voltage of the system, i.e. about 10½ volts in a 12 volt system. When contacts 118 and 120 are open, the resistance 114 is included in the field 32 circuit and the current flow through the field is reduced. When the contacts 118 and 120 are closed, the resistance 114 is shorted from the field circuit so that the energization of the field is at a maximum. Thus when the starter is engaged, the resistance 114 will initially be included in the field circuit. This will considerably reduce the output of the alternator 20. When the prime mover becomes self-operative, the rotation of the alternator 20 will be increased and its output correspondingly increased to a value sufficient to cause the coil 122 to cause contacts 118 and 120 to close. This will effectively shunt the resistance 114 from the field circuit and permit the field energization to increase so that the alternator system will function in a normal manner. It is apparent that once the contacts 118 and 120 are closed, they will remain closed even though the alternator is not producing its rated voltage for the voltage required by coil 122 to close contacts 118 and 120 is appreciably less than the rated system voltage. This means the resistance 114 will be included in the field circuit only during the initial starting periods and once contacts 118 and 120 close, they will remain closed until the alternator output has dropped below the output which occurs during idling of the prime mover.

While the embodiment of the present invention as herein disclosed, constitutes a preferred form, it is to be understood that other forms might be adopted.

What is claimed is as follows:

1. In an electric generating and starting system for a motor vehicle wherein the generating system includes an alternator having an exciting field and output terminals, a rectifier having input terminals connected in circuit with the output terminals of the alternator and an output terminal connected in a direct current circuit with a storage battery, a cutout relay having a magnetic coil and switch contacts in said direct current circuit, a means in circuit with said battery and the output terminal of said rectifier for indicating that the output of said rectifier is sufficient to charge said battery and means in circuit with said field and the output terminal of said rectifier for varying the energization of said field in response to the output of said rectifier, and wherein the starting system includes a relay having a magnetic coil winding in circuit with said battery and the output terminal of said rectifier, the combination comprising; a means for reducing the energization of said field when the output of said rectifier is less than a predetermined value, and a means including an auxiliary rectifier and an auxiliary relay for controlling the energization of said cut-out relay.

2. In an electric generating and starting system for a motor vehicle wherein the generating system includes an alternator driven by a prime mover having an exciting field winding and output terminals connected through a rectifier with a storage battery and the starting system includes a starting motor for initially rotating said prime mover and a relay having an energizing coil connected in a circuit with the rectifier and battery, and means for reducing the energization of said field until the output of said alternator exceeds a predetermined value.

3. In an electric generating and starting system for a motor vehicle wherein the generating system includes; an alternator having an exciting field and output terminals connected in a circuit through a main rectifier to a storage battery and the starting system includes; a starting motor which is arranged to rotate a prime mover which also rotates the alternator, a relay having a coil winding, said coil winding having terminal ends connected in circuit with said rectifier and storage battery, a relay for breaking the circuit between said main rectifier and battery having normally open switch contacts in the circuit between the rectifier and battery and a magnetic actuating coil winding connected to said rectifier and arranged to close said switch contacts when said actuating coil winding is energized from said rectifier; and means for controlling the energization of said actuating coil winding, said means including a third relay having normally open switch contacts in circuit with said actuating coil winding and an auxiliary rectifier having input terminals connected with the output terminals of said alternator and output terminals connected to a magnetic coil winding of said third relay whereby said third relay will close a circuit to the actuating coil of said second relay so that the actuating coil of said second relay is energized by the output of said main rectifier.

4. In an electric generating and starting system for a motor vehicle wherein the generating system includes an alternator having an exciting field winding and a rectifier conected with a storage battery and the starting system includes a starting motor and a means including a relay having an energizing coil winding connected with said rec- tifier and storage battery for controlling the energization of said motor from said battery, a means for reducing the energization of said field when the voltage output of said alternator is less than a predetermined value.

5. In an electric generating and starting system for a motor vehicle wherein the generating system includes an alternator driven by a variable speed prime mover and having an exciting field winding and output terminals connected through a rectifier to a load circuit that includes a storage battery, a means including an indicating lamp having terminals respectively connected with said rectifier and battery, and the starting system includes a starting motor for rotating said prime mover connected in circuit with said battery and a means including a relay for controlling the energization of said starting motor, said relay having an actuating coil connected in a circuit parallel with the circuit between said rectifier and battery, the combination comprising a third means for opening and closing the circuit between said rectifier and battery, said third means including a second relay having a pair of normally open switch contacts in said circuit and an actuating coil connected in a circuit with said rectifier, said third means including a third relay having normally open switch contacts in the circuit between said rectifier and the actuating coil of said second relay and an actuating coil for said third relay adapted when energized to close said contacts, an auxiliary rectifier having input terminals connected to the output terminals of said alternator and output terminals connected for energizing the coil on said third relay and a means for reducing the energization of said field during periods when the starting motor is rotating said prime mover.

6. In an electric generating and starting system for a motor vehicle wherein the generating system includes an alternator driven by a variable speed prime mover and having an exciting field winding and the starting system includes a starting motor for initially rotating said prime mover, a means for reducing the energization of said field winding when said starting motor is rotating said prime mover.

7. In an electric generating system for a motor vehicle, the combination comprising an alternator rotatively driven by a variable speed prime mover and having an exciting field winding and output terminals connected through a rectifier with a direct current load circuit including a storage battery, means connected with said field for reducing the energization thereof when the output of said alternator exceeds a predetermined value, and means for reducing the energization of said field during the initial rotation of said alternator by the prime mover.

8. In an electric generating system for a motor vehicle, the combination comprising; an alternator rotatively driven by a variable speed prime mover having an exciting field winding and output terminals connected through a rectifier to a direct current load circuit including a storage battery, the combination comprising; means connected with said load circuit and said field winding for reducing the energization of said field when the said alternator is initially rotated by said prime mover.

9. In an electric generating system for a motor vehicle, the combination comprising; an alternator rotatively driven by a variable speed prime mover having an exciting field winding and output terminals connected through a rectifier to a direct current load circuit including a storage battery, means connected with said load circuit and said field winding for reducing the energization of said field when the output of said alternator exceeds a predetermined maximum and means for reducing the energization of said field when the alternator is initially rotated, said last mentioned means being operative to reduce the energization of said field whenever the output of said alternator is less than a predetermined minimum limit.

10. In an electric generating system for a motor vehicle, the combination comprising; an alternator having output terminals and an exciting field winding, a rectifier having input terminals connected to the output terminals of said alternator and output terminals connected to a direct current load-circuit including a storage battery, a circuit means in parallel with said load circuit and connected between the battery and output terminals of said rectifier for indicating that the output of said alternator is rectified by said rectifier, and a means in said load circuit for making and breaking the load circuit in response to the output of said rectifier, said means including; a relay having normally open switch contacts in said load circuit and an actuating coil connected in circuit with the output terminals of said rectifier, and a means for making and breaking the circuit between said actuating coil and the output terminals of said rectifier, said means comprising; a second relay having normally open switch contacts in the circuit between the actuating coil of said first relay and said output terminals of the rectifier and an actuating coil for closing the switch contacts of the second relay and an auxiliary rectifier arranged to energize the actuating coil of said second relay from the output terminals of said alternator.

References Cited in the file of this patent

UNITED STATES PATENTS

| | | |
|---|---|---|
| 1,875,192 | Middleton | Aug. 30, 1932 |
| 2,101,207 | Williamson | Dec. 7, 1937 |
| 2,117,018 | Conrad et al. | May 10, 1938 |
| 2,117,141 | Breer et al. | May 10, 1938 |
| 2,494,749 | Fagen et al. | Jan. 17, 1950 |
| 2,519,650 | Hamilton | Aug. 22, 1950 |
| 2,557,298 | Leece et al. | June 19, 1951 |
| 2,558,644 | Claytor | June 26, 1951 |
| 2,668,271 | Harmon | Feb. 2, 1954 |
| 2,817,830 | Raver | Dec. 24, 1957 |